FERROMAGNETIC THIN MEMORY ELEMENT

Filed Nov. 23, 1964 2 Sheets-Sheet 1

INVENTORS
TAKASHI FURUOYA
ZUN KINOSHITA
YOZO SASAKI

OSTROLENK, FABER, GERB & SOFFEN
ATTORNEYS

INVENTORS
TAKASHI FURUOYA
ZUN KINOSHITA
YOZO SASAKI

OSTROLENK, FABER, GERB & SOFFEN
ATTORNEYS

United States Patent Office 3,411,892

Patented Nov. 19, 1968

3,411,892

FERROMAGNETIC THIN FILM MEMORY ELEMENT

Yozo Sasaki, Takashi Furuoya, and Zun Kinoshita, Tokyo, Japan, assignors to Nippon Electric Company Limited, Tokyo, Japan Filed Nov. 23, 1964, Ser. No. 413,276
Claims priority, application Japan, Nov. 28, 1963, 38/63,941
7 Claims. (Cl. 29—183.5)

ABSTRACT OF THE DISCLOSURE

The invention broadly discloses a memory element comprising a non-magnetic conductor wire having a ferromagnetic thin film coating and further having an intermediate coating between the ferromagnetic coating and the conductive wire of a non-magnetic metallic material which greatly enhances the magnetic properties of the ferromagnetic thin film which is quite frequently subjected to defects in the absence of the intermediate coating. The intermediate coating may be copper, zinc or cadmium.

The instant invention relates to ferromagnetic thin film memory elements, and more particularly, to a method of manufacturing ferromagnetic thin film memory elements having greatly improved magnetic properties of the type desired in memory elements.

Ferromagnetic thin film memory elements have found widespread use as memory devices in electronic computers, electronic switching systems and telephone networks, to name a few. In the fabrication of such memory elements it is typical to provide a ferromagnetic thin film by forming such a thin film coating on the surface of a wire-like non-magnetic metal substrate. Information is written into the ferromagnetic thin film by magnetizing the thin film by means of information current flowing through the wire-like metal substrate and which is read-out by means of an electromotive force induced in the wire-like metal substrate due to the inversion of the magnetic state of the thin film.

During the formation of the ferromagnetic thin film employed in such memory elements it is typical, through the use of any one of a number of well-known processes, to align the direction of the magnetic easy axis of the ferromagnetic thin film with the longitudinal axis of the wire-like metal substrate so that the circumferential direction of the wire-like metal substrate may be the direction of its magnetic easy axis and so that the direction perpendicular to the first direction, that is, the direction which is also parallel to the longitudinal axis of the conductor, is the direction of the magnetic hard axis. The magnetic easy axis is defined as the axis parallel to the direction of easy magnetization, while the magnetic hard axis is defined as the axis perpendicular to the magnetic easy axis in the case of the thin film having uniaxial anisotropy.

In the case where the ferromagnetic thin film is operationally employed as a memory element, the magnetic properties required are such that, in the direction of the magnetic easy axis, the B–H curve has a first steep section which corresponds to the condition of easy magnetization with the magnetic field being nearly equal to a coercive force $H_c$ and has a substantially flat section which corresponds to the condition of saturation. Thus the B–H curve has a rectangular hysteresis loop having an extremely high rectangular parity coefficient.

In the direction of the magnetic hard axis, the B–H curve merely approximates a rectilinear shape such that the coercive force for the magnetic hard axis is extremely small, while the anisotropy field corresponding to the magnetic field where this curve begins to saturate is substantially small; and the anisotropy field corresponding to the magnetic field where the curve begins to saturate is also quite small. The anisotropic field is that field which exists in the region of hard magnetization, i.e., that portion of the hysteresis loop where the magnetic material has reached saturation.

When the alignment of the direction of magnetic easy axis along the surface of the ferromagnetic thin film is physically perfect, the B–H curve in the direction of the magnetic easy axis is shown to be an ideal perfectly rectangular hysteresis loop, and the B–H curve in the direction of hard magnetization axis ideally consists of three straight-line portions which intersect at predetermined angles relative to one another. However, it should be noted that such perfect alignment cannot be realized as a practical matter.

Ferromagnetic thin film memory elements are typically manufactured by forming a ferromagnetic thin film consisting of iron-nickel alloy, or some other suitable ferromagnetic material which film is formed on the surface of either a planar or wire-like non-magnetic metal substrate which is preferably composed of Phosphor-bronze, or other suitable material, with the film being formed by the process of vacuum evaporation, sputtering in an environment of a low pressure inert gas atmosphere, or by means of electrodeposition of a suitable solution through which the non-magnetic metal substrate is passed.

Even assuming any of the above processes to be employed in the formation of a ferromagnetic thin film structure, it has been extremely difficult to perfectly align the magnetic easy axis in the desired direction yielding the consequences of B–H curves in the desired direction of the magnetic easy axis and the magnetic hard axis which are far from the ideal curves desired. Thus, even though thin film ferromagnetic memory elements may be presently realized the curves showing the characteristics of such present day memory elements depart significantly from the desired B–H curves and a great deal of effort has been exerted in order to improve the characteristics so as to achieve the ideal curves in practice.

Exhaustive experimentation has shown that the cause of imperfect alignment of the magnetic easy axis is due to surface defects or non-uniform distortion which appears in the region adjacent the surface of the non-magnetic conductor substrate, which defects or distortion occur due to the rolling and other forming processes used during the manufacture of such wire-like or planar substrates and thereby adversely affect the alignment of the magnetic easy axis when the magnetic thin film is being formed.

Of the three processes for forming the thin film which are referred to above, it has been found that the electroplating process is a low cost procedure and is very advantageous from a practical viewpoint in that it permits the continuous forming of a uniform ferromagnetic thin film on the wire-like substrate. However, it has been found through the use of the electroplating process that the adverse effect of the above mentioned non-uniform distortion in the surface of the metal substrate used under the thin film has been shown to be greater than that distortion which is found in the other processes with the result that the rectangularity of the B–H curve in the direction of the easy magnetization axis of the ferromagnetic thin film is relatively poor while the shape of the B–H curve in the direction of the magnetic hard axis is quite undesirable. Therefore, although it is desirable for any one of the processes to eliminate the adverse effect of the above mentioned nonuniform distortion within the surface of the non-magnetic metal substrate upon the alignment of the magnetic easy axis in the ferromagnetic thin film formed thereon, elimination of the adverse effect upon the memory element when produced through the electroplating process becomes a very significant problem to be solved since it would permit the manufacturer of a ferromagnetic thin film memory element having properties which are equal to or superior to the magnetic properties which are obtainable through the other two film forming processes with the result that a thin film memory element can be formed having characteristics which are at least equal to and in most cases superior to those characteristics found in thin film memory elements formed through the use of the other two processes with the added significant advantage of the low costs entailed in the electroplating process together with the advantage of permitting the continuous formation of a uniform ferromagnetic thin film on a wire-like base substrate which is possible through the use of the electroplating process.

It is therefore one object of the instant invention to provide a novel method for manufacturing ferromagnetic thin film memory elements in which the distortion found in the surface of the non-magnetic metal substrate used under the thin film will not have any adverse effect upon the magnetic properties of the ferromagnetic thin film formed thereon.

Another object of the instant invention is to provide a novel method for manufacturing ferromagnetic thin film memory elements in which the direction of the magnetic easy axis of the ferromagnetic thin film formed on the non-magnetic metal substrate very closely approaches perfect alignment along the thin film surface and is substantially unaffected by distortion present in the nonmagnetic metal substrate which is used under the thin film.

Still another object of the present invention is to provide a method of manufacturing ferromagnetic thin film memory elements which may employ any one of the processes of electrodeposition, evaporation and sputtering in the formation of the memory element wherein the direction of the magnetic easy axis of the ferromagnetic thin film formed on the non-magnetic metal substrate very closely approaches perfect alignment and is substantially unaffected by non-uniform distortion in the surface of the non-magnetic metal substrate employed under the thin film layer.

According to a feature of the present invention, there is provided a method of manufacturing ferromagnetic thin film memory elements comprising the steps of providing, on a non-magnetic metal substrate, a non-magnetic thin film having a predetermined thickness, and forming a ferromagnetic thin film on said non-magnetic thin film in such a manner that the direction of its magnetic easy axis is substantially perfectly aligned through the use of any known method, whereby the magnetic properties of the ferromagnetic thin film are unaffected by non-uniform distortion existing in the surface of the non-magnetic substrate.

According to another feature of the present invention, there is provided a method of manufacturing ferromagnetic thin film memory elements comprising the steps of forming a non-magnetic thin film on a non-magnetic metal substrate having a predetermined thickness by the electroplating process of a suitable solution, forming a ferromagnetic thin film on said non-magnetic thin film by an electroplating process; and aligning the direction of its magnetic easy axis according to any known method whereby non-uniform distortion in the surface of the metal substrate has no effect upon the magnetic properties of the ferromagnetic thin film.

According to still another feature of the present invention, there is provided a method of manufacturing ferromagnetic thin film memory elements comprising the steps of providing a thin film of copper upon a non-magnetic metal base having a predetermined thickness by the electrolyzing process of a suitable solution, and forming a thin film of iron-nickel alloy on the thin film of copper by the electroplating process enabling the direction of its magnetic easy axis to be substantially ideally aligned through the use of any well known method.

According to still another feature of the present invention, there is provided a method of manufacturing ferromagnetic thin film memory elements consisting of the steps of providing a thin film of cadmium having a predetermined thickness upon a non-magnetic metal base by the electrolyzing process of a suitable solution, and forming a thin film of iron-nickel alloy on the thin film of cadmium through the electroplating process such that the direction of its magnetic easy axis may be suitably aligned according to any known method.

According to still another feature of the present invention, there is provided a method of manufacturing ferromagnetic thin film memory elements consisting of the steps of providing a thin film of zinc having a predetermined thickness upon a non-magnetic metal substrate by the electrolyzing process of a suitable solution; forming a thin film of iron-nickel alloy on the thin film of zinc through the electroplating process; and suitably aligning the direction of its magnetic easy axis in accordance with any known method.

The above and other features and advantages of the instant invention will become more apparent and the invention itself will be best understood with reference to the following description taken in conjunction with the accompanying drawings, wherein:

FIGURE 1 is a graphical representation, showing the curves of an anisotropy field $H_k$, coercive force in the direction of magnetic easy axis $H_{ec}$, and coercive force in the direction of magnetic hard axis $H_{hc}$ as a function of thickness A of an intermediate layer of copper employed in a ferromagnetic thin film memory element which is manufactured according to one preferred embodiment of the invention.

FIGURE 2 is a graphical representation similar to FIGURE 1, with respect to a ferromagnetic thin film memory element which is manufactured according to another preferred embodiment of the invention which employs cadmium as the intermediate layer.

FIGURES 3*a* and 3*b* show, the B–H curves in the directions of magnetic hard axis and magnetic easy axis, respectively, of a ferromagnetic thin film memory element manufactured according to the method of the present invention employing cadmium as an intermediate layer.

FIGURES 4*a* and 4*b* show the B–H curves in the directions of magnetic hard axis and magnetic easy axis, respectively, of a ferromagnetic thin film memory element manufactured in contrast to the ferromagnetic thin film memory element of the invention, having the B–H curves shown in FIGURE 3, without providing the intermediate layer of cadmium but under the same conditions with respect to all other fabrication steps, respectively.

FIGURES 5*a* and 5*b* show the B–H curves in the directions of magnetic hard axis and magnetic easy axis, respectively, of a ferromagnetic thin film memory element manufactured employing zinc as an intermediate layer.

FIGURES 6*a* and 6*b* show the B–H curves in the directions of magnetic hard axis and magnetic easy axis, respectively, of a ferromagnetic thin film memory element manufactured in contrast to the ferromagnetic thin film memory element of the invention, having the B–H curves of which are shown in FIGURES 5*a* and 5*b*, without providing the intermediate layer of zinc but under the same conditions with respect to all other fabrication steps.

Figure 1:
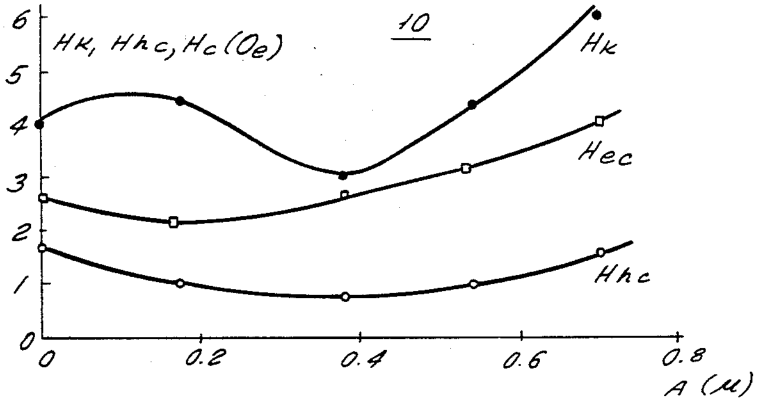

Referring now to the drawings, FIGURE 1 shows a plot of the quantities $H_{hc}$, $H_k$ and $H_{ec}$ and the manner in which these quantities change with the change in thickness of the intermediate layer. The quantity $H_{ec}$ represents the coercive force in the direction of the magnetic easy axis, $H_{hc}$ represents the value of the coercive force in the direction of the magnetic hard axis, and the value $H_k$ represents anisotropy field, i.e. the value of the magnetic field at the point on the B–H curve for the magnetic hard axis where saturation begins.

Figure 7:
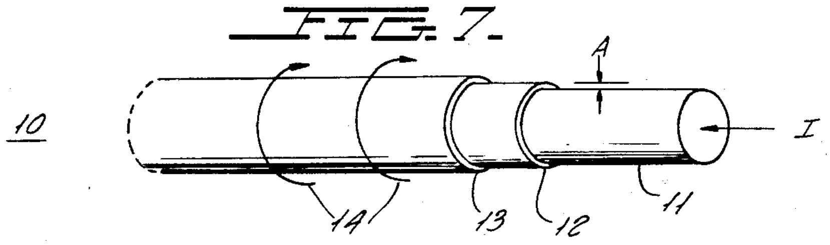
FIGURE 7 is a perspective view of one preferred memory element of the instant invention.

The ferromagnetic thin film memory element is manufactured through the use of a process comprising the steps of providing a Phosphor-bronze wire having a diameter of preferably 0.1 mm. Referring to FIGURE 7, there is shown therein a completed embodiment 10, wherein the Phosphor-bronze wire is designated by the numeral 11. It should be understood that any other suitable material may be employed for the wire 11.

A thin film of copper having a thickness A is deposited on the non-magnetic wire conductor 11 by means of an electrolyzing process of a solution of copper gluconate, Referring to FIGURE 7, the layer or thin film of copper is designated by the numeral 12 and is shown to have a thickness A.

The next step is comprised of forming a ferromagnetic thin film of iron-nickel alloy comprised of 81.5% Ni and 18.5% Fe. The ferromagnetic thin film layer preferably has a thickness of 0.9 micron in one preferred embodiment of the instant invention. Referring again to FIGURE 7, the ferromagnetic thin film layer is designated by the numeral 13.

The values $H_k$, $H_{ec}$ and $H_{hc}$, shown in the plot of FIGURE 1 were obtained by varying the thickness A of the copper thin film layer 12 over the range from 0–0.8 micron.

During the manufacturing process, the Phosphor-bronze wire was continuously electrodeposited with a thin film of copper while it was moved through an electroplating bath containing a solution of copper gluconate at a velocity of three cm. per second. The thickness A of the copper thin film 12 was controlled by varying the total electroplating current utilized in the electrolyzing operation in the range from 0–300 milliamps and it is then subsequently electrodeposited.

Phosphor-bronze wire 11 on which the copper thin film 12 has been electrodeposited is then subsequently electrodeposited with a thin film of iron-nickel alloy through a continuous operation and while passing through another electroplating bath. During this operation a D.C. current I is applied to the core wire 11 in a direction shown by the arrow, for example (although the direction could be reversed) in order to generate a circular and coaxial magnetic field represented by the field lines 14 such that the iron-nickel alloy has the direction of its magnetic easy axis in coaxial alignment with the circumferential direction of the core wire 11 due to the presence of the magnetic field generated by the D.C. current I. It should be noted that none of the dimensional relationships of the physical elements 11, 12 and 13, shown in FIGURE 7, should be taken as being in direct proportional relationship to one another, the size and proportionality of elements being shown only for purposes of clarity and not for purposes of scientific accuracy.

Figure 8:
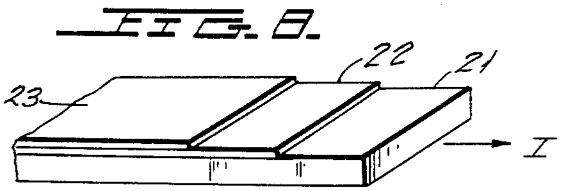
FIGURE 8 is a perspective view showing still another preferred embodiment of the instant invention.

As still a further example of the configuration of FIGURE 7, the embodiment of FIGURE 8 may be employed, which is comprised of a ferromagnetic thin film memory element 20 comprised of a flat tape-like non-magnetic metal substrate 21 which may be Phosphor-bronze, for example, and having a non-magnetic intermediate layer 22 of copper, for example, and finally having a ferromagnetic thin film layer of iron-nickel designated by the numeral 23. The current I may be passed in the direction shown by the arrow associated therewith during the electrolyzing processes employed for depositing the layers 22 and 23 upon the tape-like conductive member 21.

Turning again to the curves shown in FIGURE 1 which show a plot of the values of $H_k$, $H_{ec}$ and $H_{hc}$ as functions of the thickness A of the copper intermediate layer 12 (22), the axis at which the thickness A is equal to zero corresponds to the case where the iron-nickel alloy is directly electrodeposited on the Phosphor-bronze wire 11, in accordance with any conventional process. At the value A equal zero, $H_k$ is equal to 4 oe.; $H_{ec}$ is equal to 2.6 oe. and $H_{hc}$ is equal to 1.6 oe. The B–H curve in the direction of magnetic easy axis corresponding to the value A is equal to zero, has extremely poor rectangularity and the B–H curve in the direction of hard magnetization has a considerably open loop.

As the thickness A of the copper intermediate layer is increased by means of successively increasing the total electroplating current for copper in the manner described above, the valve $H_{hc}$ gradually decreases until it takes the minimum value of $H_{hc}$ equals 0.8 oe. in the neighborhood of A equal to 0.4 microns for the thickness A of the copper intermediate layer 12. Thereafter, $H_{hc}$ begins to increase in a monotonic fashion as the thickness A increases.

$H_k$ increases somewhat as the thickness A begins to increase, but soon thereafter it begins to decrease and assumes a minimum value of $H_k=3.0$ oe. in the neighborhood of $A=0.4$ micron for the copper intermediate layer. Thereafter, $H_k$ increases monotonically as the thickness A of the copper layer 12 increases.

$H_{ec}$ initially decreases and assumes the minimum value in the neighborhood of $A=0.2$ micron and thereafter, increases monotonically with increase in thickness A of the copper intermediate layer. In the region of $A=0.4$ micron, $H_{ec}$ closely approaches the value of $H_k$, therefore in the exemplary embodiment set forth above, a ferromagnetic thin film memory element 10 having the best magnetic properties can be obtained through the use of an intermediate copper layer having a thickness A of 0.4 micron.

From these experimental results, it can be seen that the non-magnetic intermediate layer provided as part of the memory element structure 10 will not provide the optimized effect if the intermediate layer is either too thick or too thin. However, such a limitation upon the thickness of the intermediate layer is not essential for the practice of the instant invention. More particularly, as will be seen from the graphic representations shown in the instant application, in the region or relatively small thickness, while in the absence of the copper intermediate layer the alignment of the direction of the easy magnetization axis and thus the magnetic properties of the ferromagnetic thin film electrodeposited on the non-magnetic substrate are substantially deteriorated due to the adverse effect of the non-uniform distortion in the surface of the non-magnetic metal substrate, the non-uniform distortion in the surface of the substrate or wire 11 (or member 21) is satisfactorily averaged out by providing the copper intermediate layer and gradually increasing its thickness, with the result that the non-uniform distortion in the substrate surface 11 has a less adverse effect upon the outer ferromagnetic thin film layer 13, such that the alignment of the direction of the easy magnetization axis will be determined solely by the condition of electrodeposition of the ferromagnetic thin film itself and consequently providing the inherent magnetic properties desired.

Just how much thickness is required for the non-magnetic intermediate layer is dependent upon the surface condition of the non-magnetic substrate 11 to be employed and the kind of non-magnetic material which is employed as the intermediate layer 12.

In the case where the surface condition of the non-magnetic metal substrate is relatively uniform, it is sufficient to provide a relatively thin intermediate non-magnetic layer to provide the desirable magnetization characteristics. In the case where the surface condition is relatively poor in uniformity within the substrate 11 a sufficiently corrective effect cannot be obtained unless a relatively thick intermediate non-magnetic layer is provided. It will therefore be apparent from the comparison between the above mentioned embodiment and other embodiments to be set forth herein using cadmium and zinc as the intermediate layer, that the required thickness of the intermediate layer 12 will vary depending upon the type of non-magnetic material employed.

On the other hand, the reason why there is such great tendency for the magnetic properties of the ferromagnetic thin film to become deteriorated as the thickness A of the intermediate layer increases and most particularly where the thickness A of the copper intermediate layer is greater than 0.4 micron as shown in FIGURE 1, is presumably due to the fact that the condition for electrodepositing the copper intermediate layer in the first embodiment causes the electroplating current density to become too large in order to provide a flat copper intermediate layer. Therefore, if the design of the copper electroplating bath and the electroplating current density are adjusted so as to provide a flat surface of the copper intermediate layer, even at large thicknesses A, such disadvantageous effects will thereby be eliminatd, and consequently the optimum thickness of the copper intermediate layer will be enabled to become larger and the improvement in the magnetic properties of the ferromagnetic thin film will be still further enhanced. Thus, the upper limit of the thickness A of the non-magnetic intermediate layer which is formed employing the method of the instant invention, is in no way critical as it involves the inventive aspects of the method described herein. The upper limit of the thickness of the non-magnetic intermediate layer is dependent not only upon the condition for electrodeposition but also upon the kind of non-magnetic material employed and this will become further apparent when comparing the embodiment described above with another preferred embodiment employing a cadmium intermediate layer which is set forth below with reference to the curves of FIGURE 2.

Figure 2:
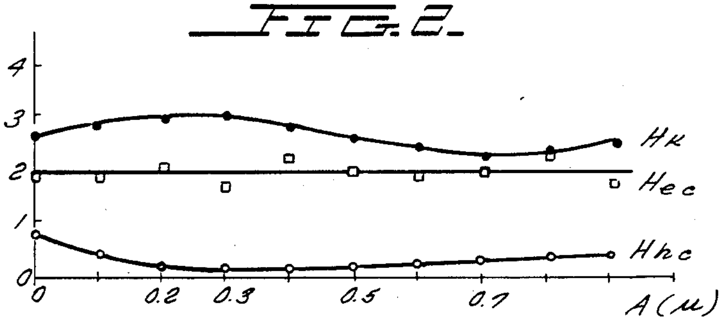

Referring now to FIGURE 2, there is shown therein curves for the values of $H_k$, $H_{ec}$ and $H_{hc}$ as these quantities vary with thickness (A) of the non-magnetic intermediate layer employed. In this preferred embodiment the conductor 11 is formed of phosphor bronze and is provided with a thin film of cadmium which is deposited through the electrolyzing process of a solution of cadmium cyanide, and subsequently forming thereon a ferromagnetic thin film of iron-nickel alloy also deposited through an electroplating process upon the intermediate layer. It should be understood that reference can likewise be made to the structural embodiment shown in FIGURES 7 and 8 wherein in the instant preferred embodiment the phosphor-bronze wire is designated by 11, intermediate layer 12 and the ferromagnetic thin film layer 13 in the structure 10 of FIGURE 7 while the non-magnetic metal substrate is designated with numeral 21, the intermediate layer of cadmium 22 and the thin film layer 23 in the structural embodiment 20 of FIGURE 8. In the instant preferred embodiment, the variation of the quantities $H_k$, $H_{ec}$ and $H_{hc}$ as a function of thickness A of the cadmium intermediate layer is shown to have curve characteristics somewhat similar to the associated curves shown in the graphic representation of FIGURE 1, whereas $H_{hc}$ assumes a minimum value in the neighborhood of $A=0.2$–$0.3$ micron of the cadmium layer, it can be seen that the optimum magnetic properties as a whole are achieved in the neighborhood of $A=0.6$–$0.7$ microns of thickness. As compared with the embodiment using the copper intermediate layer for which the plot is shown in FIGURE 1, it is to be noted that in the case of cadmium being employed for the intermediate layer, the deterioration of the magnetic properties of the ferromagnetic thin film due to the relatively poor flatness of the surface of the intermediate layer 12 resulted from the substantially large thickness of the intermediate layer 12. Considering the curves of FIGURE 2, it can be seen that this effect does not occur in the embodiment employing cadmium until the thickness A of the intermediate layer reaches 1.0 micron.

Figure 3A:
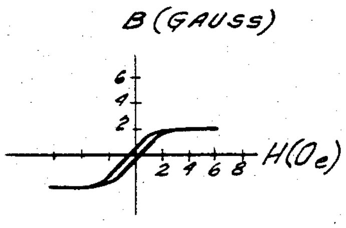
Figure 4A:
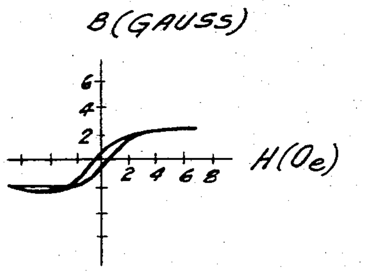
Figure 3B:
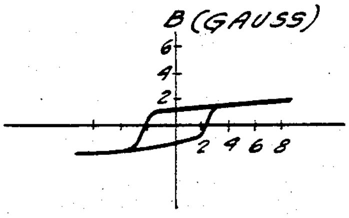
Figure 4B:
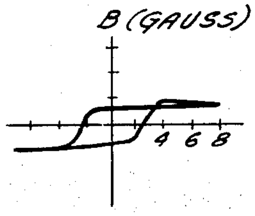

FIGURE 3*a* shows the B–H curve in the direction of the hard magnetization axis, while FIGURE 3*b* shows the B–H curve in the direction of the easy magnetization axis for a ferro-magnetic thin film memory element designed in accordance with the embodiment employing the cadmium intermediate layer and corresponding to the optimum thickness value for the intermediate layer of $A=0.6$ micron. In contrast to the characteristics of this memory element, the B–H curves in the direction of the hard magnetization axis and in the direction of the easy magnetization axis are shown in FIGURES 4*a* and 4*b* for a ferromagnetic thin film memory element which is manufactured without the provision of a cadmium intermediate layer, i.e., wherein the cadmium intermediate layer has a thickness $A=0$. However, all other process steps were employed in manufacturing the ferromagnetic thin film memory element whose curves are shown in FIGURES 4*a* and 4*b*. Comparing the B–H curves for the two respective cases, it is apparent that, through the practice of the instant invention, the rectangularity of the B–H curve in the direction of the easy magnetization axis of the ferromagnetic thin film memory element is somewhat improved, the loop of the B–H curve in the direction of the hard magnetization axis shown in FIGURE 3*a* is flattened, the anisotropy field is reduced and thus the magnetic properties of a memory element employing an intermediate layer in accordance with the method of the instant invention is substantially improved over a like memory element not employing such an intermediate layer.

The values $H_k$, $H_{ec}$ and $H_{hc}$ have also been measured with respect to another ferromagnetic thin film memory element employing zinc as an intermediate layer, which element was formed through the steps of electrodepositing from a solution of zinc cyanide a thin zinc layer on the non-magnetic metal substrate consisting of a Phosphor-bronze wire 12 (see FIGURE 7); and subsequently electrodepositing thereon a thin film of iron-nickel alloy 13, constituting the ferromagnetic thin film layer. It was found that such memory elements show almost the same characteristics as were observed in the above examples. In this third preferred embodiment the quantity $H_k$ was not too greatly improved when compared with the embodiments which employ copper or cadmium as the intermediate layer, but it was found that the quantity $H_{ec}$ was reduced considerably and the quantity $H_{hc}$ was made almost equal to zero, so that the B–H curve in the direction of the hard magnetization axis took a substantially ideal shape consisting of three straight-line portions intersecting at predetermined angles, as can be seen from the B–H curve shown in FIGURE 5*a*. In the case of the B–H curve for the easy axis the rectangularity was markedly improved. This is shown in FIGURE 5*b* which shows the B–H curve for the easy magnetization axis of a ferromagnetic thin film memory element employing a zinc intermediate layer of 0.3 micron thickness.

Figure 5A:
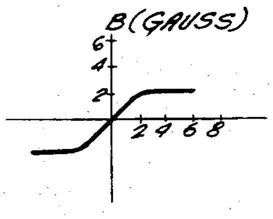
Figure 6A:
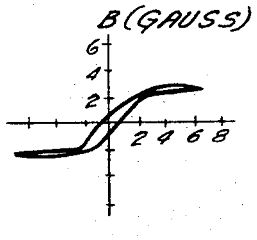
Figure 5B:
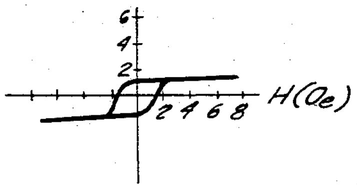
Figure 6B:
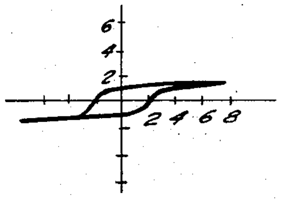

These B–H curve characteristics are compared against the B–H curves of FIGURES 6*a* and 6*b*, respectively, representing the curves for the hard magnetization and easy magnetization axes, respectively, of a ferromagnetic thin film memory element in which no zinc intermediate layer whatsoever was provided, but in which the memory element resembles the memory element of the curves of FIGURES 5*a* and 5*b* in all other characteristics and further being produced through the use of the same processes.

Comparing these B–H curves it can be seen that there is a remarkable improvement in the magnetic properties of the ferromagnetic thin film memory element having the zinc intermediate layer. As one feature of the embodiment employing the zinc intermediate layer it was found that even if the electroplating current density of the zinc is widely varied over a range from 0.1 to 2.0 amperes per cm. squared, the quantity $H_{hc}$ of the ferromagnetic thin film electrodeposited thereon was still found to be approximately zero and the quantity $H_k$ underwent only very slight variation. Such characteristics greatly facilitate and thereby simplify the manufacture of ferromagnetic thin film memory elements making the method steps extremely favorable from a practical point of view when using a zinc intermediate layer.

While the method of the instant invention, as well as the effects and advantages resulting from the method have been described above, it should be further pointed out as still another distinct advantage that the practice of the method of the instant invention permits the production of magnetic thin film memory elements having extremely uniform magnetic properties over their entire lengths. This is due to the fact that, through the use of the method set forth in the instant invention which preferably employs the electroplating process, it is possible to feed the non-magnetic metal substrate continuously at a substantially constant velocity through an electroplating bath for carrying out electrodeposition of the non-magnetic intermediate layer continuously and under the same constant conditions and further feed the conductor through a second electroplating bath immediately after having undergone the first electrodeposition process, in order to electrodeposit the ferromagnetic thin film layer on a continuous basis so that contamination and/or oxidation of the exposed surface of the intermediate layer (12 of FIGURE 7) prior to electrodeposition of the ferromagnetic thin film layer (13 of FIGURE 7) is reduced to a very great degree.

While copper, cadmium and zinc have been described as preferred materials for the non-magnetic intermediate layer, it has been further confirmed through exhaustive experimentation that the same functions and advantages have been obtained through the use of thin films of gold or silver employed as the intermediate layer material. It is also obvious that other metals beyond those described above may be employed for use as the non-magnetic intermediate layer and non-metals and other compounds may be used as well. Furthermore, it is apparent, that while in the above description the embodiments employ a wire-like or tape-like metal substrate (see FIGURES 7 and 8, respectively) the invention can be employed with equal success when using metal substrates of other configurations. Moreover, while in the above described embodiments, the present invention has employed an electroplating process for depositing the intermediate layer which provides a remarkable effect counteracting non-uniform distortion of the conductor surface, such ferromagnetic thin film memory elements may also be formed through the use of other processes such as evaporation and sputtering operations such that it is possible to improve the deterioration of the desired magnetic properties which is caused by non-uniform distortion of the surface of the non-magnetic metal substrate, such that the memory elements are prepared by providing an intermediate non-magnetic thin film layer on the non-magnetic conductor through evaporation (or sputtering) and then forming the ferromagnetic thin film in accordance with the methods of the instant invention which have been previously described.

It should be noted at this point that in any of the above exemplified embodiments the essential aspects of the instant invention reside in the steps of first providing a non-magnetic thin film layer having a predetermined thickness upon a non-magnetic conductor substrate and subsequently forming a ferromagnetic thin film thereupon in such a manner that the direction of the easy magnetization axis is aligned through the use of any well known method, with the thickness of the non-magnetic intermediate thin film layer being selected so as to eliminate the deterioration effects caused by non-uniform distortion in the surface of the non-magnetic conductor substrate, and that the methods set forth herein should not be limited with regard to the thickness of the non-magnetic thin film intermediate layer.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A thin film memory element comprising a conductor formed of a non-magnetic conductive material;
- an intermediate non-magnetic coating deposited upon said conductor, said coating being zinc;
- and a thin-film ferromagnetic coating for storing binary data deposited on said non-magnetic coating;
- the thickness of said non-magnetic coating being selected to minimize the effect of surface defects present in said conductor upon the ferromagnetic coating.

2. The memory element of claim 1 wherein said conductor is Phosphor bronze.

3. The memory element of claim 2 wherein said ferromagnetic coating is an iron-nickel alloy.

4. The memory element of claim 3 wherein the thickness A of said mon-magnetic coating lies substantially within the range $0.2 \angle A \Sigma 1.0$ microns.

5. The memory element of claim 4 wherein the thickness of the ferromagnetic coating is approximately 0.9 micron.

6. The memory element of claim 5 wherein the conductor has a wire-like configuration and whose diameter is approximately 0.1 millimeter.

7. The memory element of claim 1 wherein said conductor has a wire-like configuration; said intermediate non-magnetic coating and ferromagnetic coating being substantially annular shaped layers.

References Cited

UNITED STATES PATENTS

| | | | |
|---|---|---|---|
| 3,330,631 | 7/1967 | Tsu | 29—194 XR |
| 2,039,069 | 4/1936 | Domm | 29—183.5 |
| 3,180,715 | 4/1965 | Simon | 29—194 |
| 3,183,492 | 5/1965 | Chow et al. | 340—174 |
| 3,243,269 | 3/1966 | Lommel et al. | 29—183.5 |

HOWARD S. WILLIAMS, *Primary Examiner.*

G. KAPLAN, *Assistant Examiner.*